April 30, 1968 W. STORK 3,380,587

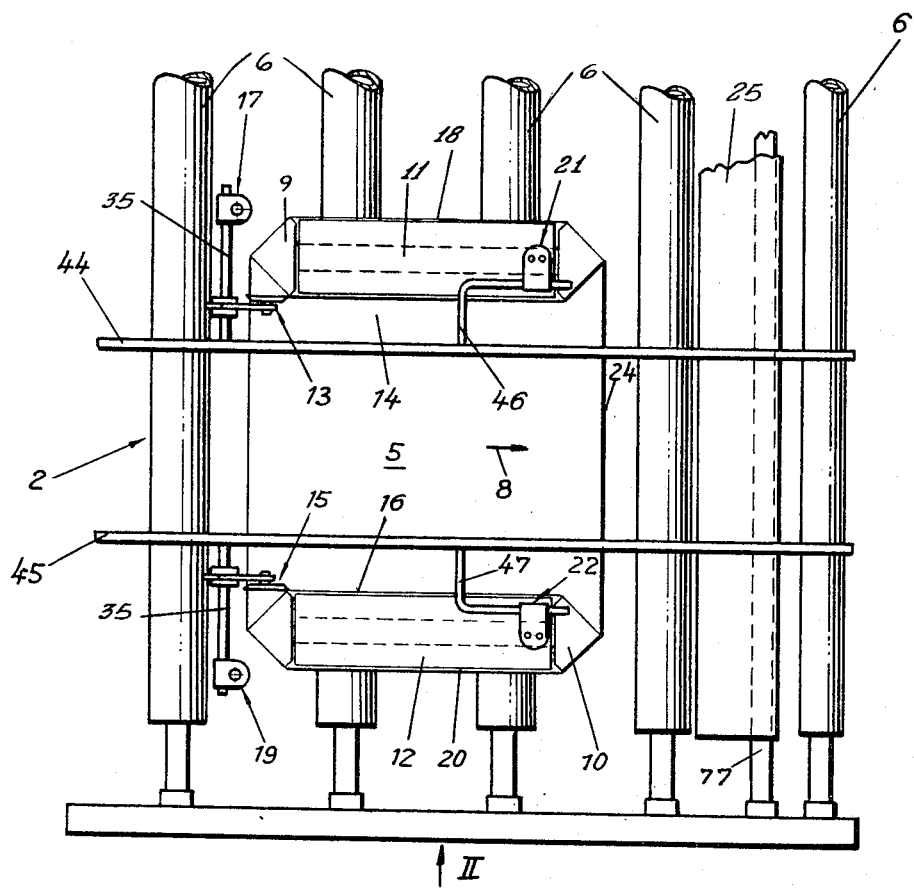

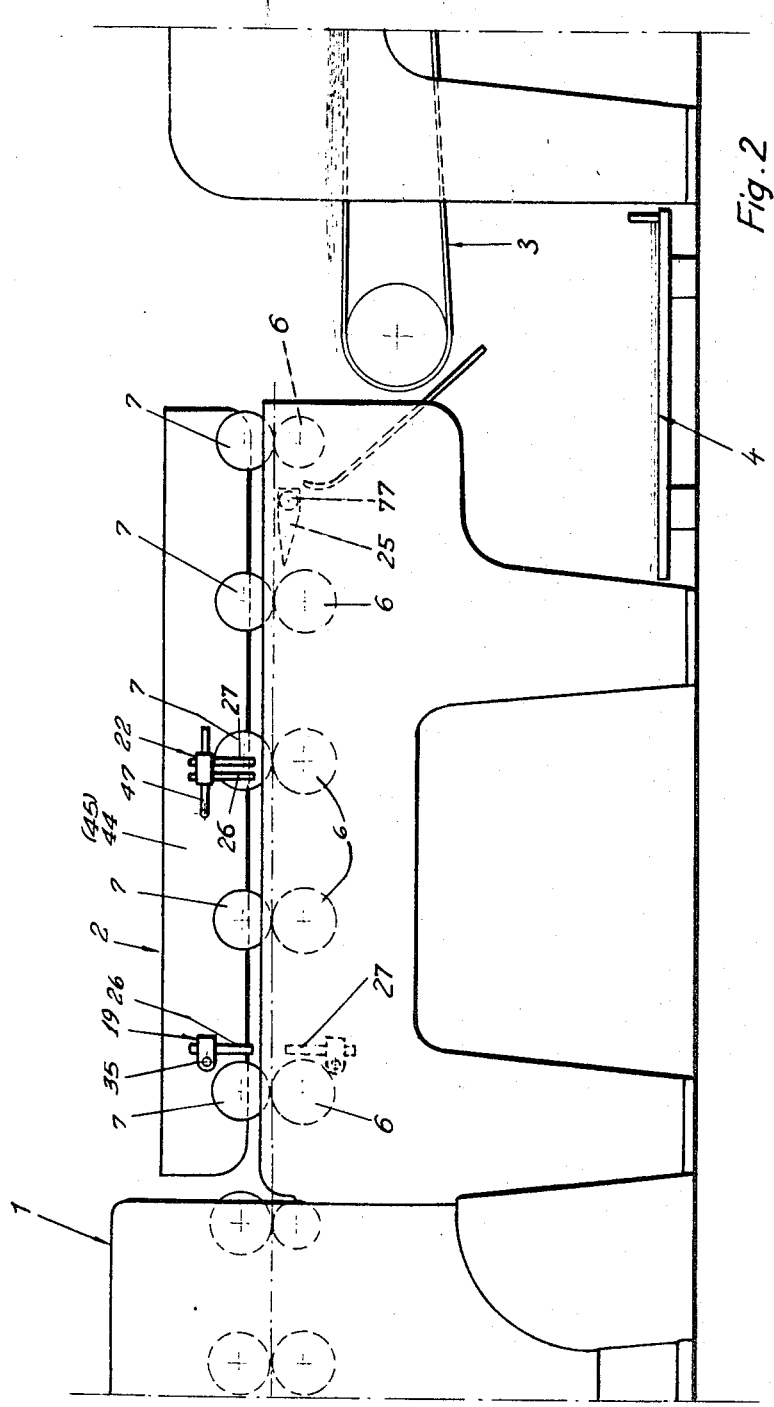

SACK-MAKING MACHINE INCLUDING A DELIVERY STATION

Filed Sept. 1, 1965 10 Sheets-Sheet 3

Inventor
Willi Stork
By Stevens, Davis, Miller & Mosher
Attorneys

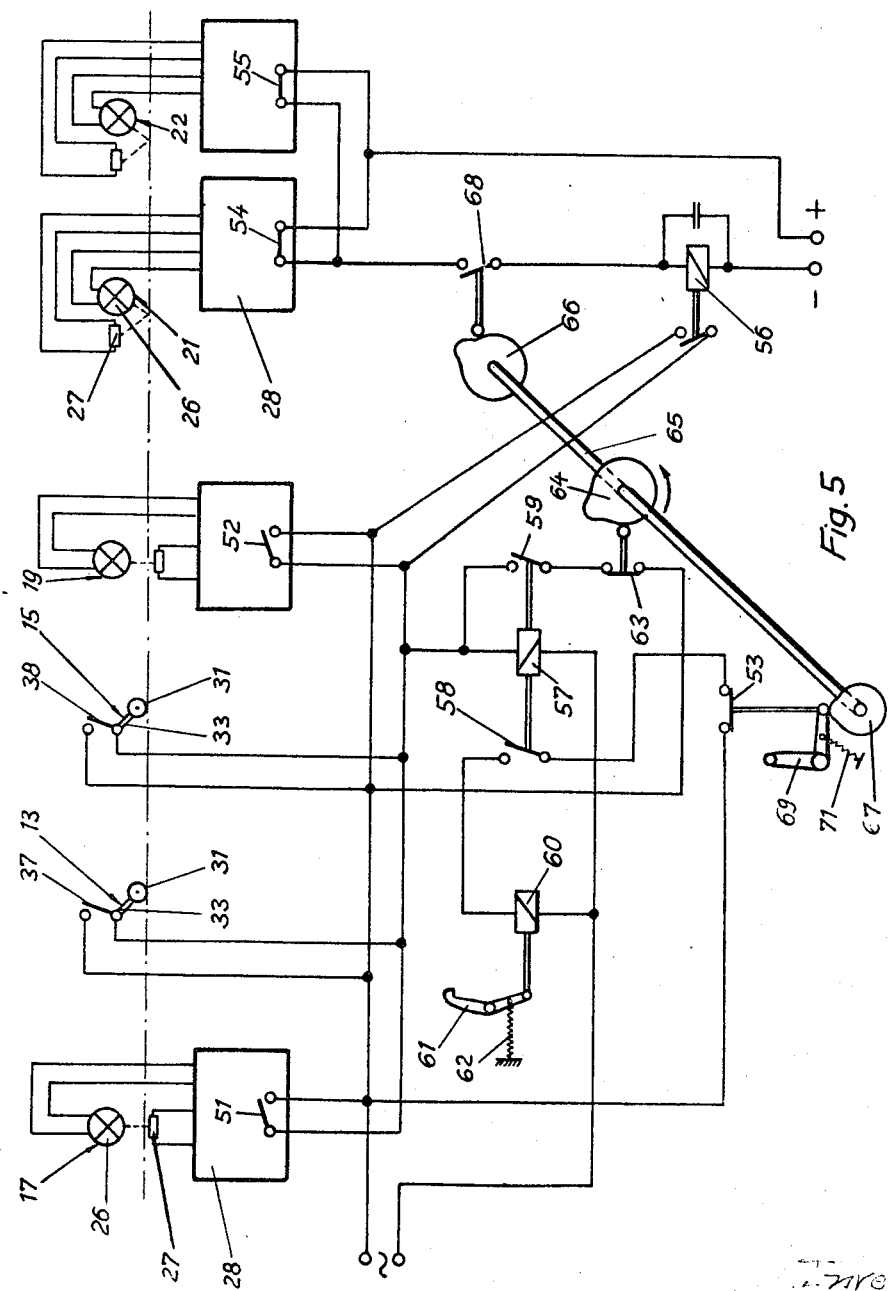

April 30, 1968 W. STORK 3,380,587

SACK-MAKING MACHINE INCLUDING A DELIVERY STATION

Filed Sept. 1, 1965 10 Sheets-Sheet 6

April 30, 1968   W. STORK   3,380,587
SACK-MAKING MACHINE INCLUDING A DELIVERY STATION
Filed Sept. 1, 1965   10 Sheets-Sheet 7

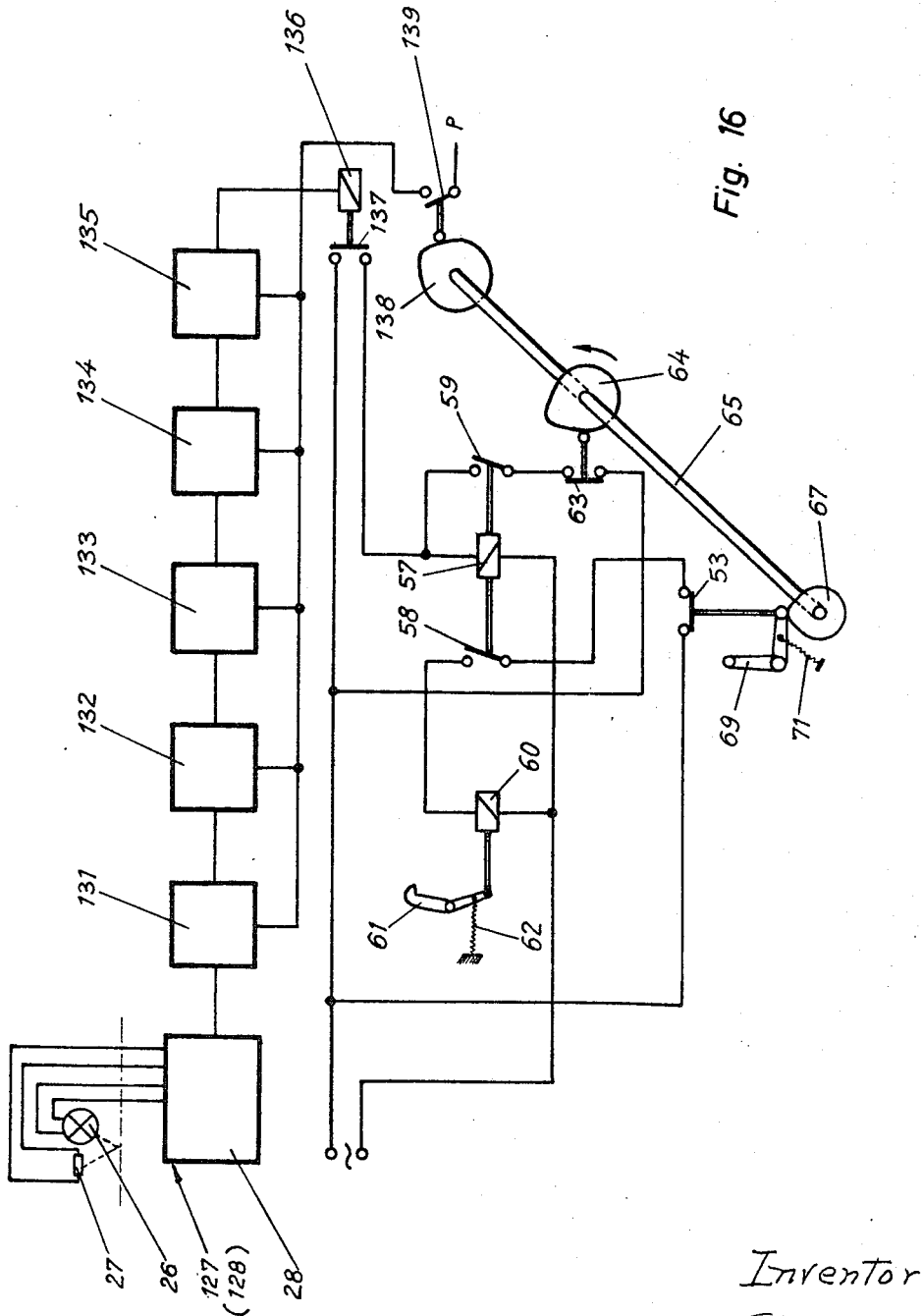

United States Patent Office 3,380,587
Patented Apr. 30, 1968

3,380,587
SACK-MAKING MACHINE INCLUDING A
DELIVERY STATION
Willi Stork, Tecklenburg, Germany, assignor to
Windmöller & Hölscher
Filed Sept. 1, 1965, Ser. No. 484,387
Claims priority, application Germany, Sept. 11, 1964,
W 37,534
20 Claims. (Cl. 209—80)

ABSTRACT OF THE DISCLOSURE

In a sack-making machine, a movable deflector interposed in the path of conveyance between a bottom laying station and a delivery station for diverting defective sacks from the delivery station to a waste delivery station, and a bottom checking sensing means for checking sacks moving along the path of conveyance and for actuating the movable deflector responsive to sensing a defective sack. The sensing means includes at least two sensing elements each of which upon sensing a defect operates one of a plurality of switch contacts of a release circuit for controlling the deflector.

In the known sack-making machines for making crossed-bottom sacks from transversely conveyed tubing sections of paper or the like, the finished sacks are fed to a slow-moving delivery conveyor, on which they are shingled and which feeds them to a delivery table at the end of the sack-making machine. The sacks are collected on this table, from which they are manually removed in batches. Thereafter, each sack bottom is inspected and rejects are discarded. To check the output of a modern heavy-duty sack-making machine, two persons are required in addition to the operators who remove the batches of sacks from the delivery table. This need for a large number of operators is a disadvantage of the sack-making machine because labor is expensive and in many cases is not even readily available.

A further disadvantage of the known sack-making machines is that when a bottom side flap provided with adhesive has not been engaged and turned over by the turnover tool, the defective bottom results in a considerable number of rejects because the shingling of the sacks on the delivery conveyor causes a smearing of adhesive onto several sacks so that they adhere to one another. If pressure belts are provided opposite to the slow-moving conveyor belt, as is generally the case, these pressure belts will also be smeared with adhesive so that the machine must be stopped to enable a cleaning of the pressure belts.

It is an object of the invention to avoid the above-mentioned disadvantages in a reliable and simple manner so that the economy and reliability of the existing sack-making machines is substantially improved.

In a sack-making machine comprising a delivery station, this is accomplished according to the invention in that a movable deflector is arranged between the bottom-laying station and the delivery station, and this movable deflector is operable by bottom-checking devices to cause defective sacks to be removed from the path of conveyance. As sacks in which the bottom is defective as regards size and location are automatically rejected, the operators for checking the finished sacks are no longer needed. Besides, a sack having a bottom side flap which has not been turned over cannot spoil other sacks because the defective sack is eliminated before it can be deposited in the delivery station or before it is shingled on the delivery conveyor.

Each of the bottom-checking devices of the sack-making machines according to the invention comprises at least two sensing elements for sensing the inner and outer side edges of each bottom, respectively, the error signal of each sensing element causing an operation of the deflector so that even a single defective bottom edge causes the deflector to reject the respective sack. The sensing elements for the inner bottom edges may suitably consist of sensing rollers. The sensing elements for the outer bottom edges may suitably consist of light barriers. The use of optical sensing means for the inner bottom edges would be difficult or impossible because the sack piles disposed under the inner bottom edges would prevent the use of light barriers at this point. Each sensing element may control one of a plurality of parallel-connected switch contacts of a release circuit for the deflector so that the deflector is responsive to the error signal from each individual sensing element, as has already been mentioned.

To ensure a satisfactory function of the deflector, it is suitable not to initiate the operation of the deflector until the sack which precedes the sack being checked has left the deflector. In a development of the invention, a storage device is provided for storing the pulses from the sensing element for a time up to the duration of one cycle of the machine. By means of the storage device, the error pulse is stored until the deflector is free and may be moved. According to the invention, the storage may be effected in a particularly desirable manner in that the switch contacts of the sensing elements are included in the circuit of a self-holding relay, which controls a switch contact included in a release circuit for a member which locks the deflector, and another switch contact of said release circuit is closed for a short time during each cycle when the sack which precedes the sack just checked has left the deflector. If no pulse from any of the sensing elements has been stored in the self-holding relay, the switch contact of the relay will not be closed when the periodically operated switch contact of the release circuit is closed so that the locking member will remain in its locking position to hold the deflector in position. On the other hand, if an error pulse transmitted by one of the sensing elements during the cycle has caused the relay to hold itself, the closing of the periodically operated switch contact will energize the means for actuating the locking member so that the latter is moved from its locking position and the deflector swings into its rejecting position. The holding circuit of the self-holding relay may include a further switch contact, which is opened for a short time once during each cycle after the closing and reopening of the periodically operated switch contact. This arrangement ensures that the self-holding condition of the relay will be terminated after the operation of the locking member and the relay will be restored to an inoperative condition, whereas the opening of the periodically operated switch contact of the release circuit has previously terminated the energization of the means for operating the locking member.

According to the invention, the deflector may be spring-biased toward its deflecting position and, during the closing of the periodically operated switch contact of the release circuit, the deflector may be moved for a short time to its inoperative position or held in the same by a camwheel, which is connected to a cyclic shaft, whereas a locking lever is pivotally movable in an outward direction by an electromagnet when the release circuit is completed, said locking lever in its normal position locking the deflector in its inoperative position. As long as the release circuit is not closed, the spring bias cannot move the deflector to its deflecting position even though the camwheel positively holds the deflector in its inoperative position only once during each cycle. After a release of the locking member, the deflector remains in its deflecting position only until it is returned to its inoperative position by the camwheel after the end of a further cycle and is locked in said position by the locking member.

When it is desired to make sacks having bottom sheets, further sensing elements for the bottom sheets of the finished sacks may be provided, in a development of the invention, and each of said further sensing elements may control one of a plurality of further switch contacts, which are connected in parallel in the release circuit for the deflector. In this case it is most desirable to provide sensing elements for the reflecting bottom sheets in the form of reflection-sensitive photocell arrangements, which are controlled by non-reflecting printed marks on the bottom sheets and have switch contacts that are included in a separate pilot circuit and are opened in response to the passage of the printed marks whereas a further switch contact of this circuit is closed once during each cycle for a short time in such a manner that in the case of a correct phasing of the pulses generated in response to the passing of the printed marks, the switch contacts of the reflection-sensitive photocell arrangements are open when said further switch contact is closed, said pilot circuit including a pilot relay, which operates a switch contact that is connected in parallel to the switch contacts of the remaining sensing elements.

The checking devices which have been described hereinbefore give satisfactory results when the defect of the bottom has been caused, e.g., by an inaccurate turning over of one bottom side flap only in a single sack. This sack is then rejected whereas the following sacks, which are satisfactory, are fed to the delivery station. If the defect affects not only a single sack but all following sacks until it is removed, for instance, when the folding plate does not operate properly or the incisions formed in the sack blanks to enable a formation of prolonged corner flaps do not have the correct location or size, the features according to the invention described hereinbefore would cause a rejection of the entire output of the sack-making machine because it is defective. The operator of the machine cannot stop the machine, or remove the defect without stoppage, until he has observed from the rejection of all successive sacks that there is a defect which affects the entire output. Those sacks which have been rejected until the defect has been removed or the machine has been stopped are useless because in all these sacks the tolerance limit regarding the location of at least one of the bottom edges has been exceeded. As a modern heavy-duty sack-making machine may make as many as 120 sacks per minute in continuous operation, there may be relatively large numbers of rejects until the defect has been removed or until the machine operator has observed that all sacks being made are rejected and has stopped the machine.

In a sack-making machine of the kind described hereinbefore, a rejection of all successive sacks when a preceding device or machine does not operate properly is prevented as far as possible in that in addition to the sensing elements discussed hereinbefore two further sensing elements for the inner and outer bottom edges, respectively, are provided at a point which lies between the desired location of the respective bottom edge and the tolerance limit for the location of this edge, and that at least one indicating device is provided, which is controlled by the pulses from these sensing elements. The use of the sensing elements provided in this further development of the invention enables a detection of an existing trend towards the making of defective sacks which exceed the tolerance limit at least at one bottom edge. If the indicating device generates a signal only for a single sack, this means that in this sack one bottom edge does not have the desired location and may even exceed the tolerance limit so that this sack is rejected. If the indicating device generates also a signal, which may be visual and/or audible, for each succeeding sack, the machine operator will notice that at least one bottom edge deviates permanently from the desired location and the tolerance limit of this bottom edge may become exceeded so that all sacks made after this limit has been exceeded will be rejected. Thus the machine operator may correct the error, possibly during the operation of the machine, or may immediately stop the machine, before any defective sack has been rejected, because the tolerance limit has not yet been exceeded.

The features which have just been described are particularly desirable in the sack-making machine described hereinbefore because in such machine the automatic checking and rejection creates a particularly great danger that a continuous production of rejects may not be observed for a relatively long time. Said features may also be applied to advantage, however, to machines which have no automatic rejecting device because any defect is detected so soon that it may be eliminated without a stoppage of the machine and without a formation of rejects.

To indicate to the machine operator more exactly where the source of the defect is to be found, a separate indicating device may be provided for each of the additional sensing elements. In this case the machine operator can detect immediately which bottom edge is affected by the defect.

In a further development of the invention, the bottom checking devices include a device for checking the presence and correct location of valve patches, and the error signal from this checking device causes also an operation of the deflector. When a valve patch has been inserted into an open crossed bottom, this patch may slip out of position so that it is located too far inwardly. In this case, the bottom side flaps will adhere to the corner flap also at the valve corner so that the valve opening will be closed by adhesive. Besides, a disturbance in the feeding may have the effect that a sack is not supplied with a valve patch so that the turning over of the bottom side flaps of the valve-receiving bottom will also cause a closing of the valve opening by adhesive. The previous need for a manual check of the filling valves is eliminated by the further development of the invention which has been described hereinbefore.

The checking device for the valve patches may comprise an initiator, which is responsive to metal coverings provided on the valve patches. Initiators, as are used in the "Logistat" system of prefabricated electronic elements, manufactured by Allgemeine Elektricitätsgesellschaft, Berlin, are electronic elements which deliver an output signal in response to the approach of a metallic element. For this embodiment of the automatic valve checking device according to the invention, a metallic covering on the valve insert is required. From the manufacturing aspect it is particularly desirable to feed simultaneously with the web for the valve patches a narrow metal foil web, preferably of aluminum foil, into the sack-making machine and to join this foil web to the web for the valve patches. In this way, each valve patch is provided with a metallic strip extending throughout the length of the valve patch.

When a sack provided with a valve patch is moved past the initiator, the latter will deliver a signal, which is transmitted through an amplifier as a control pulse. If this control pulse is late because the valve patch is disposed too far inwardly in the sack, or when a control pulse is not delivered at all because the sack has not been supplied with a valve patch, a short-time closing of a switch contact, which is operated once during each cycle of the sack-making machine at the time when the initiator ought to deliver a signal if the valve patch were properly located in the sack bottom, will cause the generation of a pulse for operating the deflector. This operating pulse is generated because a signal from the initiator is not delivered or has not been delivered in time.

In a particularly desirable embodiment of the invention, a normally closed contact, which is opened in response to the pulse from the initiator, is included in the circuit of a pilot relay, which circuit includes a further switch contact, which is closed once during each cycle for a short time in such a manner that, in the case of a proper phasing of the valve patch pulse, the normally closed contact is opened at the same time, the pilot relay operating the switch contact included in the release circuit of the deflector.

A further development of the sack-making machine according to the invention will be described hereinafter and has as its object elimination of a further source of trouble. When bottom sacks having a plurality of layers are manufactured by pulling open one end or both ends of the tube and then flattening said ends when the bottoms are still open, one or more layers of one ply may adhere to the layers of the other ply adjacent to the bottom and may be pulled open with said layers of the other ply. This may occur, e.g., when the transverse seams where the various layers adhere to each other have not been properly produced during the formation of the tube. In the finished sack, the plies will then have different numbers of layers and the weaker ply will be overstressed and may be destroyed when the sack has been filled. This defect cannot be recognized, particularly in finished valved sacks, which have two bottoms. Such defective sacks cannot be eliminated when they have been finished.

To prevent a delivery and further conveyance of multilayer sacks having different numbers of layers per ply adjacent to one or both bottoms jointly with the satisfactory sacks, a further development of the invention comprises two means for checking the correct number of layers in the two bottom side flaps, respectively, of the two bottoms which have been pulled open and are still open, the error signal from each of these checking means causing an operation of the deflector. In a further development of the invention, each means for checking the correct number of layers may comprise a reflection-sensitive photocell arrangement, which is controlled by a non-reflecting printed mark that is provided on the reflecting innermost layer of each sack blank adjacent to the bottom side flap. The additional printed marks which are required for this purpose may be provided without considerable additional expenditure during the manufacture of the tube in a usual tube drawing machine. If the respective bottom side flap has an excessive layer or lacks one layer when the bottom has been pulled open and flattened, the printed mark will be covered either by an unintended reverse folding of the innermost layer carrying such mark, or by a layer which lies on this innermost layer and belongs to the other ply. As a result, there is no nonreflection-indicating pulse. This error signal is used to deflect the deflector.

If the controllable deflector is disposed between the bottom-laying station and the delivery station and can be controlled also by the error signals from the means described hereinbefore for checking the finished bottom, the error signal indicating a wrong number of layers in a bottom which has been pulled open may be fed to the release circuit for the deflector by a shift register, which has a number of stages corresponding to the number of cycles of the machine performed during the movement of the work from the means for checking the number of layers to the further checking means. In this case the number of layers of the bottom flaps is checked in the sack-making machine at a position which is spaced a plurality of cycle steps from the deflector, and the error signal must be transmitted by one stage in each cycle of the machine so that it causes an operation of the deflector at the proper time, when the deflector is approached by that sack in which the end has been improperly pulled open before the bottom was formed and which has initiated the error signal. Where a reflection-sensitive photocell arrangement is used, a storage device is desirable connected between this photocell arrangement and the shift register, and this storage element serves to store the non-reflection-indicating pulse and permits said pulse to erase a control pulse, which is received in each cycle out of phase with the non-reflection-indicating pulse, said control pulse being transmitted to the shift register when a non-reflection-indicating pulse has not been received. According to the invention, the storage element may be adapted to be switched between two stable states, preferably by a bi-state trigger circuit, only one output being utilized, whereas one input is associated with the pulses from the reflection-sensitive photocell arrangement and the other input is associated with the control pulses. Each control pulse serves for a delayed resetting of the trigger circuit when the latter has previously been set to the other stable state by the non-reflection-indicating pulse. If the trigger stage has not been switched to its other stable state because a pulse has not been received from the amplifier of the reflection-sensitive photocell arrangement, the control pulse will be delivered to the shift register through the only output of the storage element which is used.

The invention will be explained more in detail in the subsequent description with reference to a plurality of embodiments shown by way of example in the accompanying drawings, in which:

FIG. 1 is a diagrammatic top plan view showing an embodiment of a checking and rejecting arrangement of a sack-making machine according to the invention.

FIG. 2 is a side elevation showing the checking and rejecting arrangement as viewed in the direction of arrow II in FIG. 1.

FIG. 5 is a circuit diagram of the checking and rejecting means of FIG. 1.

FIG. 16 is a circuit diagram of the checking and rejecting arrangement of FIG. 15.

Figure 4:
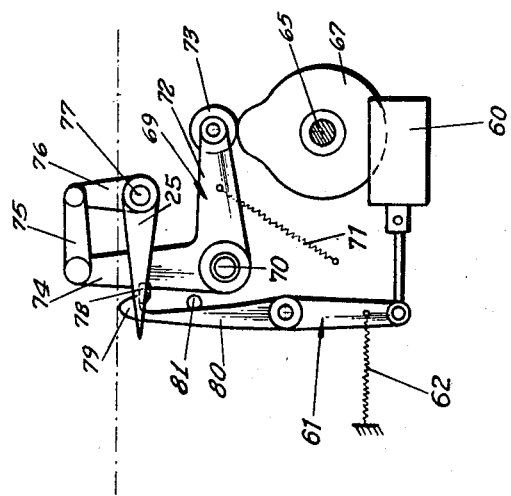
FIG. 4 is a side elevation showing the deflector and the means for locking the same.
Figure 3:
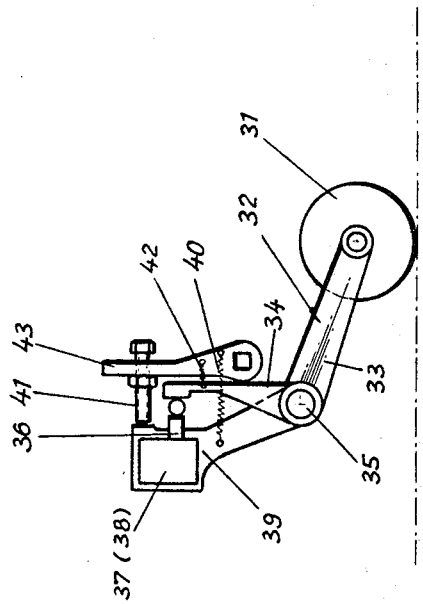
FIG. 3 is a side elevation showing a mechanically operating sensing element.

In the first embodiment, a sack-making machine 1 (FIG. 2) delivers finished valved crossed-bottom sacks to a checking and rejecting arrangement 2 according to the invention. The arrangement 2 transfers the satisfactory valved crossed-bottom sacks to a slow-moving belt conveyor 3, where they are shingled, and deflects the defective valved crossed-bottom sacks to a special means for collecting such sacks. A pallet 4 shown in FIG. 2 may be used, e.g., for collecting the defective crossed-bottom sacks. In FIG. 2, the valved crossed-bottom sacks are indicated in dash-dot lines on the belt conveyor 3 and on the pallet 4. In FIG. 1, a valved crossed-bottom sack 5 is indicated in solid lines.

Rolls 6 disposed below the plane of conveyance and rollers 7 (FIG. 2) disposed above the plane of conveyance serve for conveying the sacks through the checking and rejecting arrangement 2. Only the rolls 6 are shown in FIG. 1. Guide plates, not shown, which are disposed below the plane of conveyance, are provided between adjacent rolls 6. The plane of conveyance is indicated by a dash-dot line in FIGS. 2 to 5. The direction in which the valved crossed-bottom sacks are conveyed is indicated by the arrow 8 in FIG. 1.

In the sack shown by way of example, each of the two bottoms 9 and 10 of the valved crossed-bottom sack 5 is covered by a bottom cover sheet 11 or 12.

The checking and rejecting arrangement 2 serves for checking whether the bottoms 9, 10 of the finished valved crossed-bottom sacks 5 have the proper size and the correct location relative to the side walls of the sack, and for rejecting sacks which have defective bottoms. For this purpose, the arrangement comprises essentially (see FIG. 1) a sensing element 13 for the inner edge 14 of bottom 9, a sensing element 15 for the inner edge 16 of bottom 10, a sensing element 17 for the outer edge 18 of bottom 9, a sensing element 19 for the outer edge 20 of bottom 10, a sensing element 21 for the bottom cover sheet 12, a movable deflector 25 for deflecting the sacks to be rejected, a locking means, shown in FIG. 4, for the deflector, and switching and control elements for positioning the deflector. These switching and control elements will be described more in detail hereinafter.

It is apparent from FIG. 1 in conjunction with FIGS. 2 and 5 that in the embodiment being described the sensing elements 13 and 15 effect a mechanical sensing, and the sensing elements 17 and 19 effect a photoelectric sensing of the respective edges. The sensing elements 21 and 22 effect a photoelectric sensing, e.g., of a printed mark on the bottom cover sheets 11, 12. Each of the photoelectric sensing elements 17, 19 comprises a light source 26, a receiver 27 and an amplifier 28 for the photoelectric current (FIG. 5).

Each mechanical sensing element 13 or 15 (FIGS. 1, 3 and 5) has a feeler roller 31 (see particularly FIG. 3), which is freely rotatably mounted at the end of a pivoted lever 32. The pivoted lever forms a bell-crank lever having arms 33 and 34 and is fulcrumed on a pin 35. The free end of arm 33 carries the feeler roller 31. The free end of arm 34 cooperates with a push button 36 for controlling an electric switch. The sensing element 13 (see FIG. 5) controls a switch 37. The sensing element 15 controls a corresponding switch 38. The housing of each switch 37, 38 is secured to the free end of a further pivoted lever 39, which is also fulcrumed on the pin 35. A spring 40 biases the free end of lever 39 against an adjustable stop 41. If the weight of the feeler roller 31 and of the lever arm 33 is not sufficient to return the rocker lever 32 to its initial position when it has been swung out by a passing sack bottom, a small return spring 42 may be provided for this purpose. The stop 41 is adjustable to vary the movement to be performed by the lever arm 34 to operate the switch. Those ends of springs 40 and 42 which are not connected to the levers 32 and 39 are secured to a bracket 43, which carries also the stop 41 consisting of a screw. The bracket 43 is firmly connected to the inner wall 44 or 45 (FIGS. 1 and 2) of the machine frame. The pin 35 of sensing element 13 is secured in the frame wall 44. The pin 35 of sensing element 15 is secured in the frame wall 45.

The pin 35 secured in the frame wall 44 serves also as a bracket for the light source of sensing element 17. The pin 35 secured in the frame wall 45 serves also as a bracket for the light source of sensing element 19. Pins which correspond to pins 35 are provided below the plane of conveyance and serve as brackets for the receivers of sensing elements 17 and 19 (see FIG. 2).

Separate brackets 46 and 47 connect the sensing element 21 to the frame wall 44 and the sensing element 22 to the frame wall 45 (see FIGS. 1 and 2).

For adjustment to different sack lengths, the frame wall 44 is adjustable transversely to the direction of conveyance 8. For adjustment to different bottom widths, the sensing elements 13, 15, 17 and 19 are detachably connected to their brackets. The sensing elements 21 and 22 are secured to their brackets for adjustment in the direction of conveyance.

The sensing elements 17 and 19 are so-called light barriers. Each of them controls a switch 51 or 52 (see FIG. 5). The sensing elements 21 and 22 are reflection-sensitive photocell arrangements. Each of these arrangements controls a switch 54 or 55. FIG. 5 shows the switches 37, 38, 51, 52, 54, and 55 in their normal position. In this position, the switches 37, 38, 51 and 52 are open and the switches 54 and 55 are closed. Any one of switches 37, 38, 51, or 52 is closed only when the feeler roller 31 of at least one of the sensing elements 13 and 15 is raised, or raised beyond a certain extent, or when the light ray of at least one of the sensing elements 17 and 19 is interrupted. This can be effected only by a defective bottom, which has a wrong location or size. The switches 54 and 55 are opened whenever the ray from the light source to the receiver of the associated sensing element is not reflected or not sufficiently reflected owing to the passage of a printed mark on the bottom cover sheet.

The switches 51, 37, 38 and 52 and a switch formed by a normally open contact of a relay 56, which will be described hereinafter, are connected in parallel in an energizing circuit of a relay 57. The closing of one of said switches is sufficient for an energization of relay 57.

Relay 57 has a normally open contact 58 and a holding contact 59. The normally open contact 58 is included in the energizing circuit of a solenoid 60. This circuit includes further a release switch 53, which is closed once in each cycle of the sack-making machine. The solenoid 60 serves for pivotally moving a locking lever 61, which will be described hereinafter, to its release position against the force of a spring 62.

The holding circuit of relay 57 includes a normally closed switch 63, which is controlled by a camwheel 64, that performs one revolution in the direction of the arrow in each cycle of the sack-making machine. A cyclic shaft 65 carries the camwheel 64 and two further camwheels 66 and 67. The camwheel 66 serves to close for a very short time a switch 68, which is included in a D.C. circuit for energizing the relay 56, which is a pulse-stretching D.C. relay. This circuit includes also the two switches 54 and 55 in parallel. When either of the switches 54 or 55 is closed, the closing of switch 68 for a short time causes an energization of relay 56 so that the normally open contact of this relay will be closed.

The camwheel 67 on shaft 65 operates the release switch 53 and cooperates with a bell-crank lever 69, which serves to operate the deflector 25, as will be described hereinafter with reference to FIG. 4. The lever 69 is fulcrumed at 70 and biased by a tension spring 71. A roller 73 is freely rotatably mounted at the free end of a lever arm 72 of the lever 69. One end of a coupler link 75 is pivoted to the free end of lever arm 74. The other end of this coupler link is pivoted to the free end of a lever 76, which is non-rotatably mounted on the pivot 77 of deflector 25. The deflector 25 has a lateral extension 78, which is engaged from behind by a nose 79 at the free end of a lever arm 80 of the two-armed locking lever 61. The spring 62 tends to pull the lever 61 against a stop 81. In the position shown in the drawing, the roller 73 of bell-crank lever 69 engages the maximum-radius arc of camwheel 67. In this condition there is a small clearance between the extension 78 and the nose 79. Upon a further rotation of camwheel 67, the extension 78 engages the nose 79 so that the roller 73 clears the camwheel 67, the nose 79 of locking lever 61 preventing a movement of the bell-crank lever under the action of tension spring 71.

The camwheel 67 is so oriented on the cyclic shaft 65 that the maximum-radius arc of the camwheel cooperates with the roller 73 and operates the release switch 53 exactly when the leading edge 24 of a valved crossed-bottom sack is just approaching the deflector 25. At this time the deflector 25 is held in its normal position by the camwheel 67 rather than by the locking lever 61. The distance of the sensing elements 13, 15, 17 and 19 from an imaginary line with which the leading edge 24 of the sack is in registry at this time corresponds to the width of the widest flattened tubing sections to be processed in the sack-making machine. With reference to FIG. 5 it may be noted that the bell-crank lever 69 is not connected to the push button of release switch 53. The bell-crank lever and the release switch are merely controlled by the same camwheel 67.

The camwheel 66 is oriented on the cyclic shaft 65 to close the switch 68 for a short time when the printed mark to be sensed is exactly in controlling position below the sensing device 21 or 22 if the bottom cover sheet has the correct location in the direction of conveyance. The switches 54 and 55 are then opened because there is no reflection so that the normally open contact of relay 56 is not closed in normal operation. As the printed marks are relatively narrow and the switch 68 can be closed only for a short time in each cycle of the machine, a pulse-stretching relay 56 must be used to ensure that its normally open contact remains closed for a time which is sufficient for an energization of the relay 57 in the A.C. circuit.

The mode of operation of the checking and rejecting arrangement 2 according to the invention will be described hereinafter. A valved crossed-bottom sack 5 supplied by the sack-making machine 1 to the arrangement 2 is continuously conveyed through the arrangement by the rolls 6 and the rollers 7. The elements 13, 15, 17, and 19 sense the outer and inner edges of bottoms 9 and 10. If the bottoms are satisfactory, which means that they do not extend under the feeler rollers 31 and do not intersect the rays of light barriers 17 and 19, none of switches 37, 38, 51 and 52 is closed. If the printed marks on the bottom cover sheets pass the reflection-sensitive photocell arrangements 21 and 22 at the proper time, switches 54 and 55 will be opened at the time when the switch 68 is closed. As a result, relay 56 is not energized and its normally open contact is not closed. As none of switches 37, 38, 51, and 52 and the normally open contact of relay 56 has been temporarily closed, the relay 57 has been prevented from operating its contact 59 to hold itself.

When the maximum-radius arc of camwheel 67 engages the release switch 53, the latter is closed for a short time. As the normally open contact 58 of relay 57 is not closed, the closing of switch 53 does not affect the solenoid 60 so that the deflector 25 remains in its normal position. The valved crossed-bottom sack moves across the deflector to the belt conveyor 3 (FIG. 2). The short-time opening of switch 63 under the action of the rotating camwheel 64 has no effect.

If a sensing element 13, 15, 17, 19, 21 or 22 responds during the passing of a crossed-bottom sack, the energizing circuit of relay 57 will be closed and this relay will operate its contact 59 to hold itself. When the maximum-radius arc of camwheel 67 moves then in engagement with the release switch 53, the same is closed for a short time and solenoid 60 is energized, as contact 58 of relay 57 is also closed. The solenoid 60 effects now a pivotal movement of locking lever 61 to its release position against the force of spring 62. At this time, the roller 73 carried by bell-crank lever 69 (FIG. 4) engages also the maximum-radius arc of camwheel 67 so that friction between the extension 78 of the deflector and the nose 79 of the locking lever is avoided in order to facilitate the action of the solenoid. As the rotation of the camwheel is continued, the roller is moved by tension spring 71 onto a minimum-radius arc of the camwheel so that the bell-crank lever 69 is pivotally moved about its fulcrum 70 and the deflector 25 is pivotally moved about the axis 77 to its deflecting position. The defective valved crossed-bottom sack is then fed against the underside of deflector 25 and is diverted from the normal plane of conveyance to pallet 4. The continued rotation of cyclic shaft 65 has caused the camwheel 64 to open the switch 63 for a short time so that the energization of relay 57 through its holding circuit has been interrupted and this relay has released. The release switch 53 has previously been opened to deenergize the solenoid 60 so that the spring 62 has restored the locking lever 61 to its initial position. When the roller 73 of bell-crank lever 69 runs then up again on the maximum-radius arc of camwheel 67, the lever and with it the deflector 25 are swung back to their initial position, and the extension 78 of the deflector snaps under the nose 79 of locking lever 61.

In the meantime, sensing elements 13, 15, 17, 19, 21, and 22 have checked the succeeding valved crossed-bottom sack and, if the latter is defective, have transmitted a pulse to relay 57 so that the same holds itself. When the release switch 53 is closed for a short time, the solenoid 60 is energized to swing the locking lever 61 to its release position against the force of spring 62. The operation is then continued as described hereinbefore.

If the valved crossed-bottom sack is satisfactory, no pulse is transmitted to relay 57 so that the normally open contact 58 of this relay remains open. In this case the solenoid 60 will not be energized by a closing of the release switch 53 so that the tension spring 71 cannot swing the deflector 25 to its deflecting position.

In the manufacture of open crossed-bottom sacks or of sacks having no bottom sheet, the sensing devices which are not required are suitably disconnected.

Figure 6:
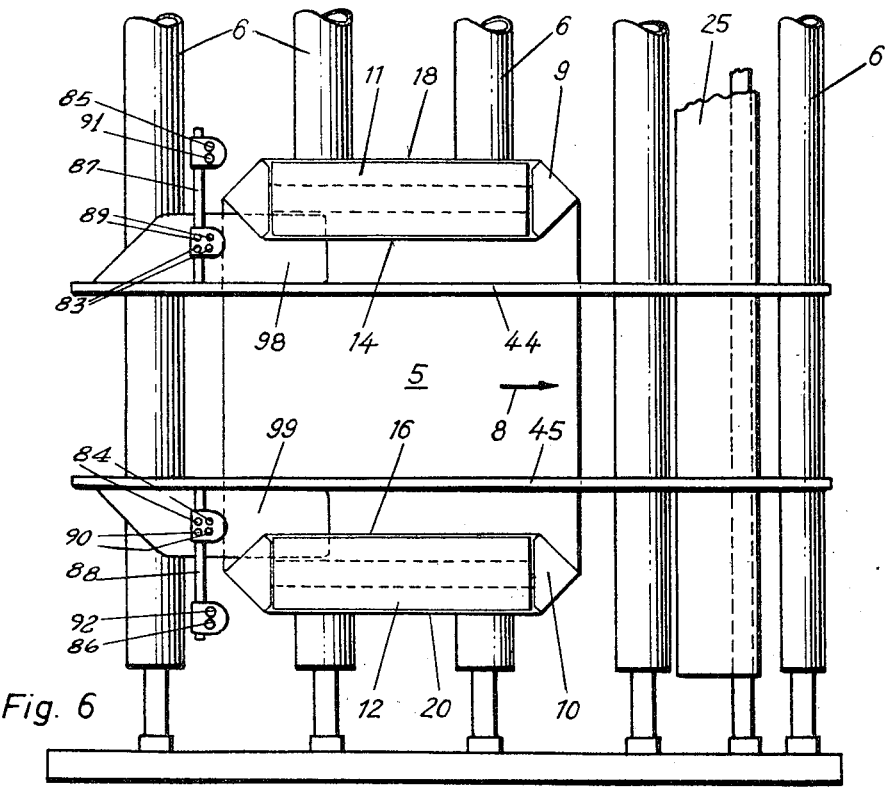
FIG. 6 is a diagrammatic top plan view showing a second embodiment of a checking and rejecting means according to the invention.
Figure 7:
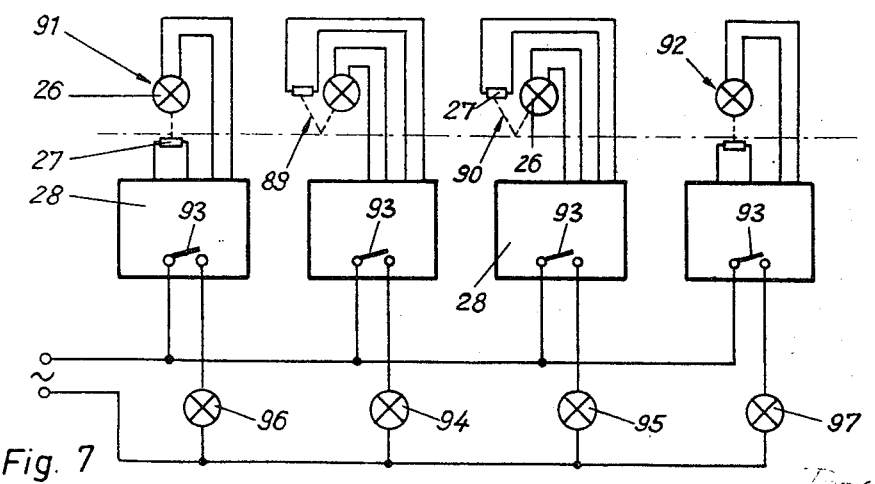
FIG. 7 is a circuit diagram of the sensing and indicating means of the checking and rejecting arrangement according to FIG. 6.

FIGS. 6 and 7 show an embodiment of the checking and rejecting arrangement according to the invention, which generates an alarm signal in response to a trend to form one or more defective bottom edges in all successive sacks, for instance, because the folding plate does not operate properly or because the incisions made in the sack blanks to enable the formation of prolonged corner flaps do not have the correct location or size. In FIG. 7, the plane of conveyance is indicated by a dash-dot line. The direction in which the valved crossed-bottom sacks are fed is indicated in FIG. 6 by the arrow 8, just as in FIG. 1.

As in the embodiment shown in FIGS. 1 to 5, the checking and rejecting arrangement serves primarily for checking whether the bottoms 9 and 10 of the finished valved crossed-bottom sacks 5 have the proper size and the proper location with respect to the side walls of the sack, and to eliminate sacks having defective bottoms. For this purpose, the arrangement comprises essentially (see FIG. 6) a sensing element 83 for the inner edge 14 of bottom 9, a sensing element 84 for the inner edge 16 of bottom 10, a sensing element 85 for the outer edge 18 of bottom 9, a sensing element 86 for the outer edge 20 of bottom 10, sensing elements, not shown, for the bottom cover sheets 11 and 12, a movable deflector 25 for deflecting the sacks to be rejected, the switching and control elements for positioning the deflector, and the means for locking the deflector. The switching and control elements are not shown in this case and are the same as those described hereinbefore.

The sensing elements 83 to 86 effect a photoelectric sensing of the respective bottom edge. In the present embodiment the sensing elements for the inner bottom edges 14 and 16 consist also of photoelectric sensing arrangements. Each sensing element comprises a light source, a receiver and an amplifier for the photoelectric current. The sensing elements 85 and 86 are light barriers. The sensing elements 83 and 84 are reflection-sensitive photocell arrangements. The sensing elements 83 and 85 are connected by a separate bracket 87 to the frame wall 44.

The sensing elements 84 and 86 are connected by a bracket 88 to the frame wall 45.

Just as in the embodiment described before, the rejection of the sacks which have a defective bottom and in which the location of any of the bottom edges is beyond the tolerance limit for this bottom edge, is effected in that the defective bottom interrupts the ray from the light source to the receiver of the sensing elements, or controls said ray in such a manner that it is no longer reflected or no longer sufficiently reflected. This controls the switching and control elements described with reference to FIG. 5.

It has been found in practice that the entire output of the sack-making machine may be rejected as being defective. This will occur if the defect affects not only the respective sack but all sacks being manufactured. Such a defect may reside, e.g., in an improper operation of a folding plate. Another defect may reside in an improper location of the incisions formed at the ends of the blank to enable a formation of prolonged corner flaps. If these incisions are shifted during the formation of the tube, the flaps will be improperly laid and the material will be torn in the sack-making machine.

To ensure that a continuous production of rejects can be recognized immediately or can be prevented before the tolerance limit is exceeded because even the trend towards a production of rejects is indicated, the checking and rejecting arrangement now being described comprises, in a development of the invention, four indicating devices, each of which is controlled by one of four additional sensing elements 89 to 92. The sensing elements 89 and 90 are reflection-sensitive photocell arrangements, as are the sensing elements 83 and 84. The sensing elements 91 and 92 are light barriers, as are the sensing elements 85 and 86. These additional sensing elements serve for an additional sensing of the inner and outer bottom edges of each sack bottom 9 or 10 and are disposed within the tolerance range of the width of each sack bottom near the sensing elements which control the switching and control elements for the deflector 25. Like the sensing elements described hereinbefore, each of the sensing elements 89 to 92 comprises a light source 26, a receiver 27 and a photoelectric multiplier 28 (FIG. 7). Each sensing element controls a switch 93. As is shown in FIG. 7, these switches are normally open. Each switch 93 is included in the circuit of a separate indicating device, such as an incandescent lamp 94 to 97.

If the bottoms of the sacks made in the sack-making machine have the desired size, the rays from the light sources of sensing elements 89 to 92 to the receivers will not be interrupted or will be sufficiently reflected by sheet metal elements 98 and 99, which are provided on the frame walls 44 and 45. As a result, the switches 93 are open and the incandescent lamps 94 to 97 are deenergized. During the passage of a sack having a defective bottom, at least one bottom edge of which exceeds the tolerance limit, the light ray of at least one of the sensing elements 83 to 86 will be interrupted so that a pulse is delivered, which controls the switching and control elements for positioning the deflector. The signal lamp of the additional sensing device for checking the respective bottom edge is lighted at the same time.

As has been described hereinbefore, the additional sensing elements 89 to 92 are disposed in the tolerance range of the width of the sack bottoms. If none of the incandescent lamps 94 to 97 is lighted during the passage of a sack, the sack bottoms are satisfactory and the bottom edges do not lie even close to the tolerance limit. The lighting of any of the lamp does not necessarily indicate that the sack has a defective bottom, which exceeds the tolerance limit. However, if the same lamp is lighted during the passage of each sack, the machine operator will recognize that the respective bottom edge lies beyond the tolerance limit in all sacks or that there is a trend for this bottom edge to move beyond the tolerance limit when the manufacture is being continued. Which of these two conditions is present can be ascertained by the machine operator by checking whether or not there is a rejection of finished sacks. In either case, the machine operator can take the steps required to remove the defect and can stop the machine when rejects are being produced. It may be possible to remove the defect before any defective sacks are rejected. The reject alarm device described with reference to FIGS. 6 and 7 may be used to advantage also in a sack-making machine which has no automatic rejecting device. In conjunction with an automatic rejecting device, however, the alarm device is a particularly useful improvement because there is no continual human inspection, and a continual rejection of the sacks being manufactured might remain unobserved for a long time.

Figure 8:
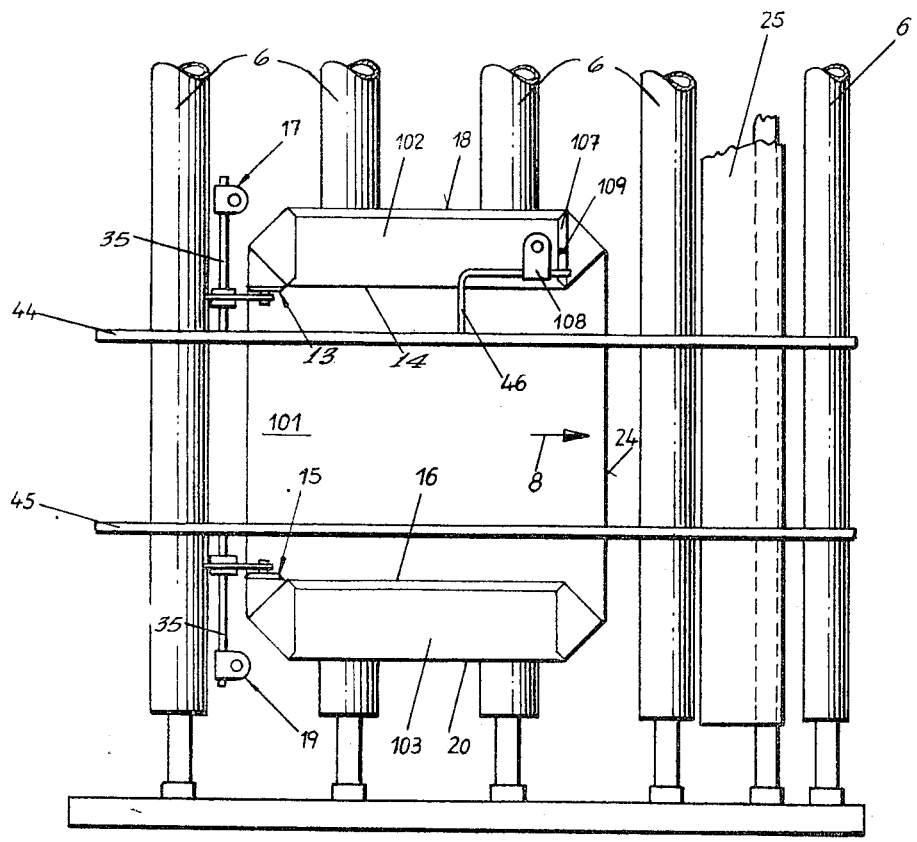
FIG. 8 is a diagrammatic top plan view showing a further embodiment of a checking and rejecting arrangement according to the invention.
Figure 9:
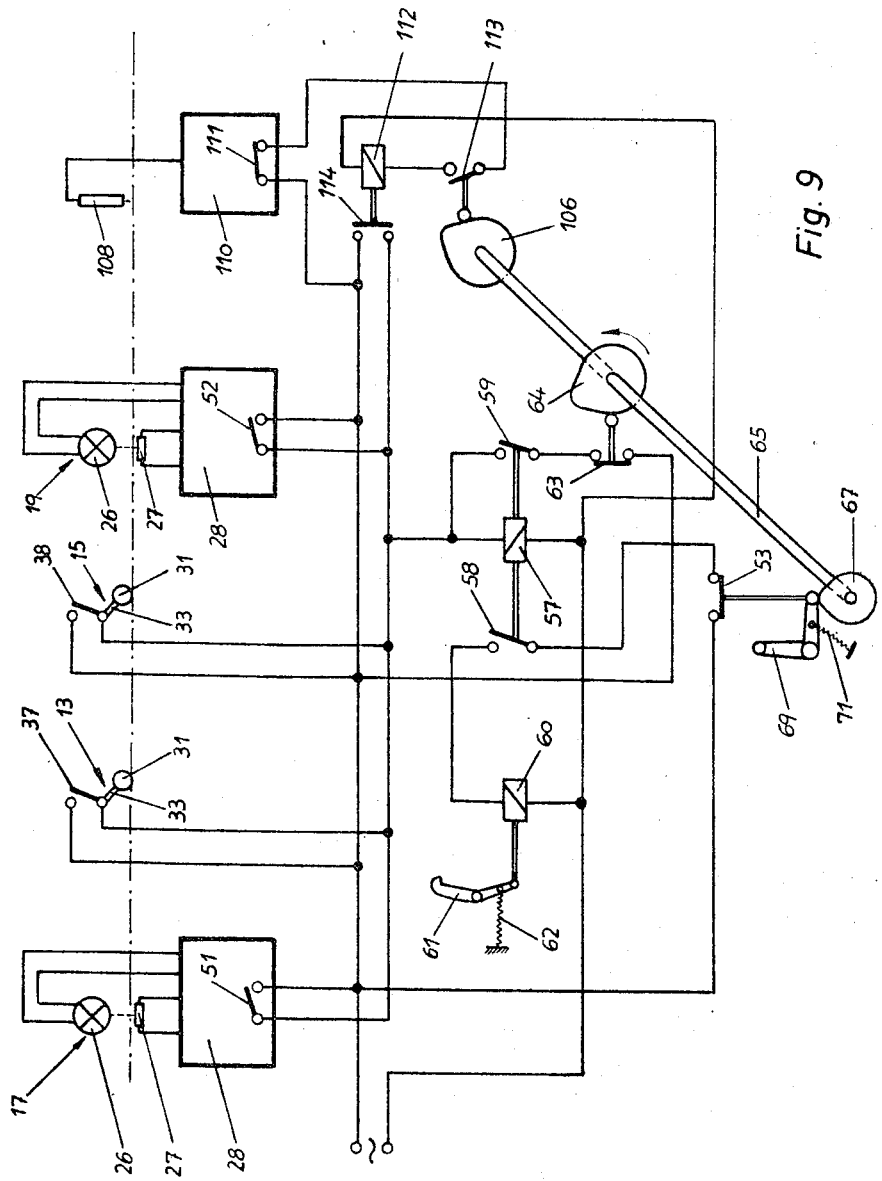
FIG. 9 is a circuit diagram of the checking and rejecting arrangement of FIG. 8.

FIGS. 8 and 9 show a further embodiment, which comprises a device for checking the presence and correct location of valve patches. The main part of the sack-making machine, which is not shown in FIG. 8, delivers finished valve-receiving crossed-bottom sacks 101 to the checking and rejecting arrangement shown in FIG. 8. This arrangement transfers satisfactory valved crossed-bottom sacks to a slow moving belt conveyor, not shown, on which the sacks are shingled. The arrangement also conducts defective crossed-bottom sacks to a separate device, not shown, for collecting these sacks. Rolls 6 disposed below the plane of conveyance and rollers, not shown, which are disposed over the plane of conveyance, serve for conveying the sacks through the checking and rejecting arrangement. Guide plates, not shown, are provided between adjacent rolls 6 and disposed below the plane of conveyance, which is indicated by a dash-dot line in FIG. 9. The direction of conveyance of the valved crossed-bottom sacks is indicated by the arrow 8 in FIG. 8. The two bottoms of the valved crossed-bottom sack 101 are designated 102 and 103.

The checking and rejecting arrangement again serves primarily for checking whether the bottoms 102 and 103 of the finished valved crossed-bottom sacks 101 have the proper size and proper location with respect to the side walls of the sack, and for rejecting sacks which have a defective bottom. Inasmuch as the arrangement agrees with the arrangement described in conjunction with the first embodiment to perform these functions, its description will not be repeated. Those parts of FIGS. 8 and 9 which agree with parts of the embodiments described hereinbefore are designated with the same reference numerals. In the present embodiment, the checking and rejecting arrangement of the first embodiment has been supplemented by a device for checking the filling valves of the sacks and for generating a pulse that causes an operation of the deflector 25 when a sack must be rejected because it has no valve patch or because the valve patch is disposed too far inwardly so that the valve opening of the sack is in either case closed by adhesive. In the present embodiment an initiator 108 is provided for checking the presence and correct location of the valve patch 107 (FIG. 8). This initiator generates an output signal whenever a valve patch has been moved past the initiator at a sufficiently small distance therefrom. As the initiator responds only to metallic parts, the valve patch must be provided with a metallic part.

For this reason, each valve patch is provided according to the invention, preferably on its outside surface, at least partly with a conducting metallic layer. In the embodiment which is described and shown, the valve patch 107 has a small strip 109 of aluminum foil, which is as long as the valve patch. Whereas a metal spot would be sufficient for a check, it is simple in the manufacture to feed together with the web for the valve patch a narrow web of aluminum foil into the sack-making machine and to join the latter web to the web for the valve patches.

The initiator 108 is secured to a bracket 46 for adjustment in the direction in which the sacks are conveyed. The bracket is secured to the frame wall 44 (FIG. 8). The initiator delivers signals to an amplifier 110 (FIG. 9), which in the present embodiment has its output connected to a relay having a normally closed contact 111. This contact 111 is included in the energizing circuit of a relay 112. This circuit includes also a switch 113, which is controlled by the cam-wheel 106. The camwheel 106 is provided on the cyclic shaft 65. This shaft carries also the camwheels 64 and 67, which have already been described. The relay 112 comprises a normally open contact 114, which is included in the energizing circuit of relay 57 and connected in parallel to the switches 51, 37, 38, and 52. Thus, the device for checking the valve patches may control the deflector 25 in the manner described hereinbefore just as the sensing elements 13, 15, 17, and 19.

The mode of operation of the embodiment of FIGS. 8 and 9 will now be described. A valved crossed-bottom sack 101 discharged from the main part, not shown, of the sack-making machine is continuously conveyed through the checking and rejecting arrangement. When the leading end of the valve patch 107 moves past the initiator 108, the latter generates a signal which is transmitted by the amplifier 110 as a control pulse to the relay connected to the output of the amplifier so that the normally closed contact 111 is opened. The camwheel 106 is oriented on the cyclic shaft 65 to close the switch 113 for a short time once during each cycle when a valve patch correctly located in the sack bottom would cause the initiator to deliver a signal so that the normally closd contact 111 must be open. In this case, the relay 112 is not energized and the normally open contact 114 is not closed when the switch 113 is closed. This is the result of the passage of a valve patch 107 which is properly located in the bottom 102 of the valved crossed-bottom sack 101.

If the control pulse for the relay connected to the output of the amplifier 110 is late because the valve patch is disposed too far inwardly in the sack, or if a control pulse is not received at all because a valve patch has not been fed to the sack blank, the normally closed contact 111 is still closed when the switch 113 is being closed. As a result, the relay 112 is energized and the contact 114 is closed. The closing of contact 114 completes the energizing circuit of relay 57 so that the operation of the deflector 25 is initiated in the manner described hereinbefore to reject the defective, valve-receiving crossed-bottom sack.

Figure 10:
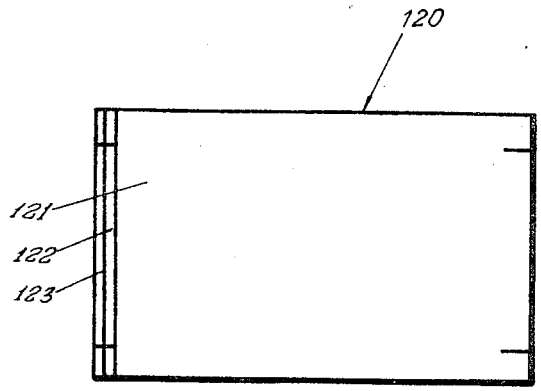
FIG. 10 is a top plan view showing a three-layer sack blank in the condition in which it is fed to the sack-making machine.
Figure 11:
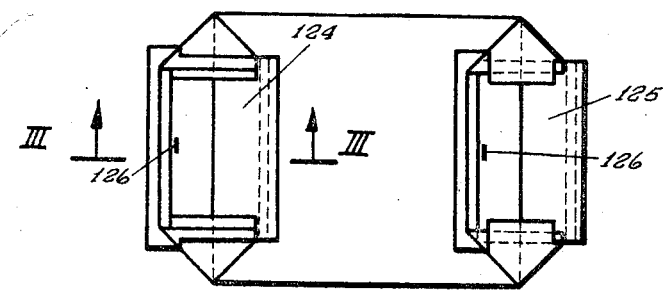
FIG. 11 shows the sack blank of FIG. 10 with the tube section ends pulled open and flattened.

In the embodiment of an arrangement according to the invention to be described with reference to FIGS. 10 to 16, a check is also made of whether or not the correct number of layers have been pulled open in each ply of the tube when the open crossed bottoms were pulled open. FIG. 10 shows a three-layer tube 120 with layers 121, 122, and 123 having staggered ends. This tube serves as starting material in the manufacture of a valved crossed-bottom sack. To enable the formation of rectangular bottom side flaps, each layer is provided with incisions at the ends in known manner. The so-called open crossed bottoms are obtained by pulling open the two ends of the tube 120, as is shown in FIG. 10, and then flattening the tube ends. FIG. 11 shows a sack blank in this stage of its manufacture. The open bottoms 124, 125 of this sack blank have been properly pulled open. This is apparent from the fact that the printed marks 126 provided according to the invention are exposed on the inner layer 123 of the tube. During the formation of the tube, these printed marks have been provided in a separate device, which has been added to the usual tube drawing machine.

Figure 12:
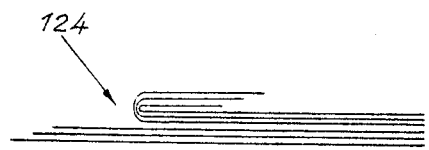
FIG. 12 is an enlarged sectional view taken on line III—III of FIG. 11.
Figure 13:
FIGS. 13 and 14 are similar sectional views taken through bottoms which have been improperly pulled open and flattened.
Figure 14:

When the sack is being pulled open to form the open bottoms and these are being flattened, one or more layers of one ply of the tube may become associated with the other ply adjacent to the bottoms. This may be due to the fact that the transverse seams adhering the layers to each other have not been properly produced. FIG. 12 shows an open bottom 124 which has been properly pulled open and flattened. FIGS. 13 and 14 show two examples of open bottoms which have not been properly pulled open and flattened.

In FIG. 13, the inner layer of the upper tube ply has not been pulled open and reversely folded together with the rest of this ply. In FIG. 14, the inner layer of the lower ply has been pulled open and reversely folded together with the upper ply. In either case, the finished sack has adjacent to its bottom a different number of layers in its plies. It is an object of the invention to prevent a feeding to the delivery station of the sack-making machine of sacks which have such defects, which are not apparent from the outside.

Figure 15:
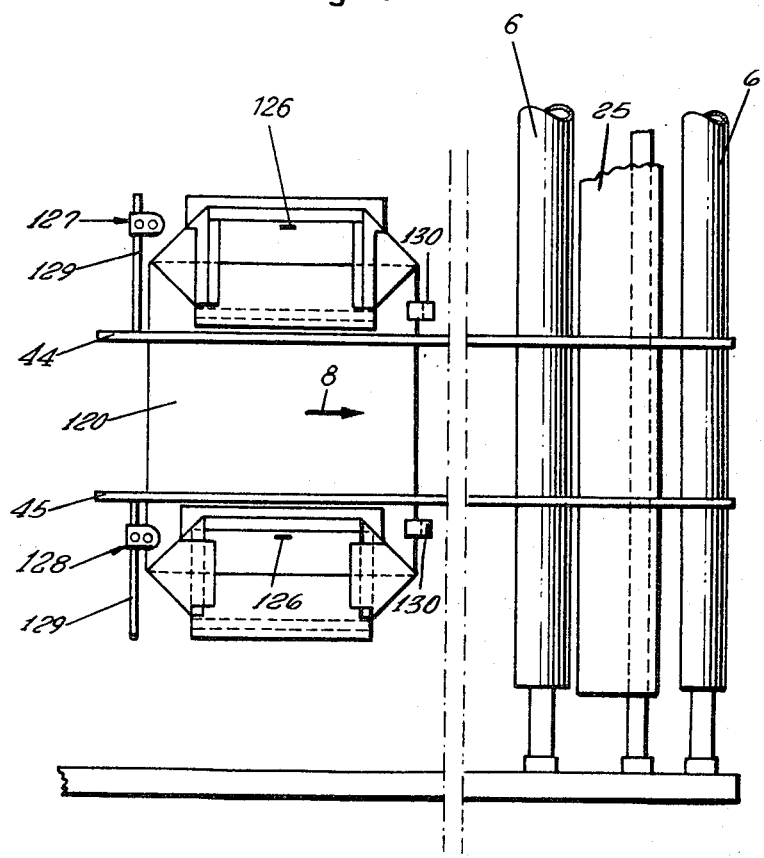
FIG. 15 is a diagrammatic top plan view showing a last embodiment of a checking arrangement according to the invention and the rejecting device succeeding this arrangement in a sack-making machine.

In FIG. 15, a sack blank according to FIG. 11, which has tube ends that have been properly pulled open and flattened, is shown in a device for checking whether the sack has been properly pulled open, as well as a movable deflector, which is controlled by the checking device and serves to reject defective sacks from the path of the conveyance. It may be assumed that in this sack-making machine a movable deflector is provided which is disposed between the bottom-laying station and the delivery station and which is controlled by devices for checking the finished bottoms, as in the embodiments disclosed hereinbefore. In this case the error signal from the checking device according to the present embodiment is utilized to operate the existing deflector, and means for completing the bottoms are provided between the checking device according to this embodiment of the invention and the deflector. These means for completing the bottom are not essential for an understanding of the present embodiment and are not indicated in FIG. 15. The dash-dot line in FIG. 15 indicates that the deflector 25 does not immediately succeed the device for checking the number of layers of the bottoms in the direction 8 in which the blank 120 is conveyed.

A reflection-sensitive photocell arrangement 127, 128 (FIG. 15) serves to check whether each tube end to be formed into a bottom has been properly pulled open. Each reflection-sensitive photocell arrangement is rigidly connected by a bracket 129 to an inner wall 44 or 45 of the machine frame. Adjacent to the device for checking the number of layers of the bottom, the sack blanks are conveyed by conveyor chains, not shown, which are provided with grippers 130. Adjacent to the deflector 25, the finished sacks are conveyed by rolls 6, which are disposed below the plane of conveyance, and rollers, not shown, which are disposed above the plane of conveyance.

Each reflection-sensitive photocell arrangement comprises a light source 26, a receiver 27, and an amplifier 28 for the photoelectric current (FIG. 16). The amplifier of each reflection-sensitive photocell arrangement 127, 128 has connected to its output an intermediate storage device 131, which has connected to its output a shift register. In the present embodiment, this shift register comprises four stages 132–135. The output of the shift register has connected to it a relay 136, which has a normally open contact 137. This normally open contact is included in the energizing circuit of relay 57. The energizing circuit of relay 57 includes the further switches of the bottom checking device. These switches are connected in parallel and are not shown here.

The cyclic shaft 65 carrying the camwheel 64 is provided with two further camwheels 67 and 138 in the present embodiment. The camwheel 138 belongs to the means for cyclically controlling the bottom layer checking device. This means will be described more fully hereinafter.

As has been described hereinbefore, the camwheel 67 on the shaft 65 operates the release switch 53 and cooperates also with the bell-crank lever 69, which serves to operate the deflector 25. The camwheel is so oriented on the cyclic shaft that its maximum-radius arc swings the bell-crank lever 69 against the force of the tension spring 71 and, at the same time, operates the release switch 53 exactly when the leading edge of a valved crossed-bottom sack is just approaching the deflector 25. At this time, the deflector is held in its normal position by the camwheel 67 rather than by the locking lever 61. If the normally open contact 58 of relay 57 is not closed at this time, the closing of switch 53 will not affect the solenoid 60 so that the deflector 25 remains in its normal position. The short-time opening of switch 63 under the action of the revolving camwheel 64 has no effect.

On the other hand, if stage 135 of the shift register delivers a pulse to energize relay 136, the contact 137 will be closed to complete the energizing circuit of relay 57, and the relay 57 will operate its contact 59 to hold itself. When the maximum-radius arc of the camwheel 67 is then moving in engagement with the release switch 53, the latter will be closed for a short time and the solenoid 60 will be energized because the contact 58 of relay 57 is closed too. The solenoid 60 will now swing the locking lever 61 to its release position against the force of spring 62. A continued revolution of the camwheel 67 permits the tension spring 71 to swing the bell-crank lever 69 and with it the deflector 25. The defective valved crossed-bottom sack is now deflected from the normal plane of conveyance to a device for collecting the defective valved cross-bottom sacks. As the cyclic shaft 65 has continued its rotation, the camwheel 64 has meanwhile opened the switch 63 for a short time so that the holding circuit of relay 57 has been opened and this relay has released. The release switch 53 has been opened before to release the solenoid 60, and the locking lever spring 62 has restored the locking lever 61 to its final position. If the bell-crank lever 69 runs up again on the maximum-radius arc of the camwheel 67, this lever and with it the deflector 25 are swung back to their initial position, an extension of the deflector snapping under the nose of locking lever 61.

The cyclic control of the storage device 131 and shift register 132–135 provided according to the invention is effected by means of the above-mentioned camwheel 138, which is provided on the cyclic shaft 65. This camwheel controls a switch 139 in such a manner that it is closed for a short time once in each cycle of the machine. The control pulse which is then received by the storage device 131 serves as a delayed resetting of a bistable trigger stage if this stage has previously been set to its other (blocking) stable state by the pulse from the amplifier 28 for the photoelectric current. If the amplifier 28 has not delivered a pulse so that the trigger stage has not been set to its other (blocking) stable state before, the storage device 131 will be conducting, and the control pulse will appear at the output of the storage device 131 and will then be received by the first stage 132 of the shift register. This pulse is then transmitted in each cycle of the machine to a succeeding stage of the shift register and energizes the relay 136 at the proper time, when the deflector is being approached by the sack which has the tube end that has been improperly pulled open before the formation of the bottom and which has initiated the nonreflection-indicating pulse. The energization of the relay 136 causes the operation of the deflector 25 in the manner described hereinbefore.

When a sack blank 120 having ends that have been properly pulled open and flattened is moving past the reflection-sensitive photocell arrangements 127, 128, each of the latter transmits a pulse through its amplifier 28 to shift the trigger stage in the storage device 131 to is blocking sate so that the control pulse which is subsequently generated by a short-time closing of switch 139 cannot reach the output of the storage device and cannot be received by the shift register but merely resets the trigger stage. On the other hand, if at least one of the two photocell arrangements 127, 128 fails to deliver a pulse because it does not sense a printed mark during the passage of a sack blank, the state of the trigger stage will not be changed so that the control pulse generated by the closing of switch 139 will appear at the output of the storage device 131 and will be received by the shift register 132–135 to cause an operation of the deflector 25 at the proper time.

What is claimed is:

1. In a sack-making machine comprising a bottom laying station, a delivery station, and means defining a path of conveyance between said stations, a movable deflector interposed in the path of conveyance for diverting defective sacks from the delivery station to a waste delivery station, and bottom checking sensing means for checking sacks moving along the path of conveyance and for actuating the movable deflector responsive to sensing a defective sack to cause same to be diverted to the waste delivery station, said bottom checking sensing means comprising at least two sensing elements, a release circuit operating the deflector and comprising a plurality of actuating switch contacts, and each sensing element controlling one of said plurality of switch contacts to actuate the release circuit.

2. A sack-making machine according to claim 1, characterized in that the two sensing elements sense the inner and outer side edges of each bottom, respectively, an error signal of either sensing element causing actuation of the deflector.

3. A sack-making machine according to claim 1, characterized in that one sensing element senses the inner bottom edges and comprises feeler rollers and the other sensing element senses the outer bottom edges and comprises light sensitive means.

4. A sack-making machine according to claim 1, characterized in that a storage device is provided for storing signals from a sensing element for a time up to the duration of one cycle of the machine.

5. A sack-making machine according to claim 1, characterized in that the sensing elements coact with switch contacts which are incorporated in the circuit of a self-holding relay, a member which locks the deflector, and a release circuit for said member which is controlled by said self-holding relay, said release circuit including a periodically operated switch contact which is closed for a short time during each cycle of the machine when the sack which precedes the sack just checked has left the deflector.

6. A sack-making machine according to claim 5, characterized in that the holding circuit of the self-holding relay includes a further switch contact, which is opened for a short time once during each cycle after the closing and reopening of the periodically operated switch contact of the release circuit.

7. A sack-making machine according to claim 1, characterized in that the deflector is spring-biased toward its deflecting position and, during the closing of the periodically operated switch contact of the release circuit, the deflector is moved for a short time to its inoperative position.

8. A sack-making machine according to claim 1, wherein a camwheel, which is connected to a cyclic shaft, acts to hold the deflector in its inoperative position, and wherein a locking lever is pivotally movable in an outward direction by an electromagnet when the release circuit is completed, said locking lever in its normal position locking the deflector in its inoperative position.

9. A sack-making machine according to claim 1, characterized in that further sensing elements for the bottom sheets of the finished sacks are provided and each of said further sensing elements controls one of a plurality of further switch contacts, which are connected in parallel in the release circuit for the deflector.

10. A sack-making machine according to claim 1, characterized in that the sensing elements for the reflecting bottom sheets are light reflection-sensitive photocell arrangements, which are controlled by non-reflecting printed marks on the bottom sheets, said arrangements including switch contacts also included in a separate pilot circuit which are opened in response to the passage of the printed marks, a further switch contact of the pilot circuit being closed once during each cycle for a short time in such a manner that in the case of a correct phasing of the pulses generated in response to the passing of the printed marks, the switch contacts of the light reflection-sensitive photocell arrangements are open when said further switch contact is closed, said pilot circuit including a pilot relay which operates a switch contact that is connected in parallel to the switch contacts of the other sensing elements.

11. A sack-making machine according to claim 1, characterized in that two sensing elements for the inner and outer bottom edges, respectively, are provided at a point which lies between the desired location of the respective bottom edge and the tolerance limit for the location of this edge, and that at least one indicating device is provided, which is controlled by signals generated by these sensing elements.

12. A sack-making machine according to claim 1, characterized in that a separate indicating device is provided for each sensing element.

13. A sack-making machine according to claim 1, characterized in that the bottom checking sensing means includes a valve patch checking device for checking the presence and correct location of sack valve patches, and the error signal derived therefrom causes also an operation of the deflector.

14. A sack-making machine according to claim 13, characterized in that the valve patch checking device comprises an initiator, which is actuated responsive to metal coverings provided on the valve patches.

15. A sack-making machine according to claim 14, characterized in that a normally closed contact, which is opened in response to a signal pulse from the initiator, is included in the circuit of a pilot relay, which circuit includes a further switch contact, which is closed once during each cycle for a short time in such a manner that in the case of a proper phasing of the valve patch pulse, the normally closed contact is opened at the same time, the pilot relay operating the switch contact included in the release circuit of the deflector.

16. A sack-making machine according to claim 1, further including layer sensing means for checking the correct number of layers in one of the two bottom side flaps of each sack bottom, the error signal from said layer sensing means causing an operation of the deflector.

17. A sack-making machine according to claim 16, characterized in that said layer means for checking the correct number of layers comprises a light reflection-sensitive photocell arrangement, which is controlled by a non-reflecting printed mark that is provided on the reflecting innermost layer of one of the two bottom side flaps of each sack bottom.

18. A sack-making machine according to claim 16, in which error signals from the layer sensing means indicating a wrong number of layers in a sack bottom are fed to the release circuit for the deflector by a shift register, which has a number of stages correlated to the number of cycles of the machine performed during the movement of the work from the layer sensing means to the deflector.

19. A sack-making machine according to claim 18, characterized in that a storage device is connected between the layer sensing means and the shift register with the storage device serving to store a nonreflection-indicating pulse derived from the photocell arrangement and permits said pulse to erase a control pulse fed thereto, which is received in each cycle out of phase with the nonreflection-indicating pulse, said control pulse being transmitted to the shift register when a nonreflection-indicating pulse has not been received.

20. A sack-making machine according to claim 19, characterized in that the storage device is switched between two stable states one of which is blocking, one input to the storage device is pulses received from the reflection-sensitive photocell arrangement which act to switch the storage device to its blocking state, and the other input is received from a source of control pulses which reset the storage device to its unblocked state, the control pulses are received first in time and an output is transferred to the shift register only if the storage device is not switched to its blocking state during a cycle of the machine.

References Cited

UNITED STATES PATENTS

| | | | |
|---|---|---|---|
| 1,190,204 | 7/1916 | St. James | 209—88 |
| 2,007,840 | 7/1935 | Terry | 209—88 |
| 2,270,565 | 1/1942 | Sharkey | 209—80 |
| 2,446,628 | 8/1948 | Brown | 209—111.7 |

M. HENSON WOOD, Jr., *Primary Examiner.*

R. A. SCHACHER, *Assistant Examiner.*